UNITED STATES PATENT OFFICE.

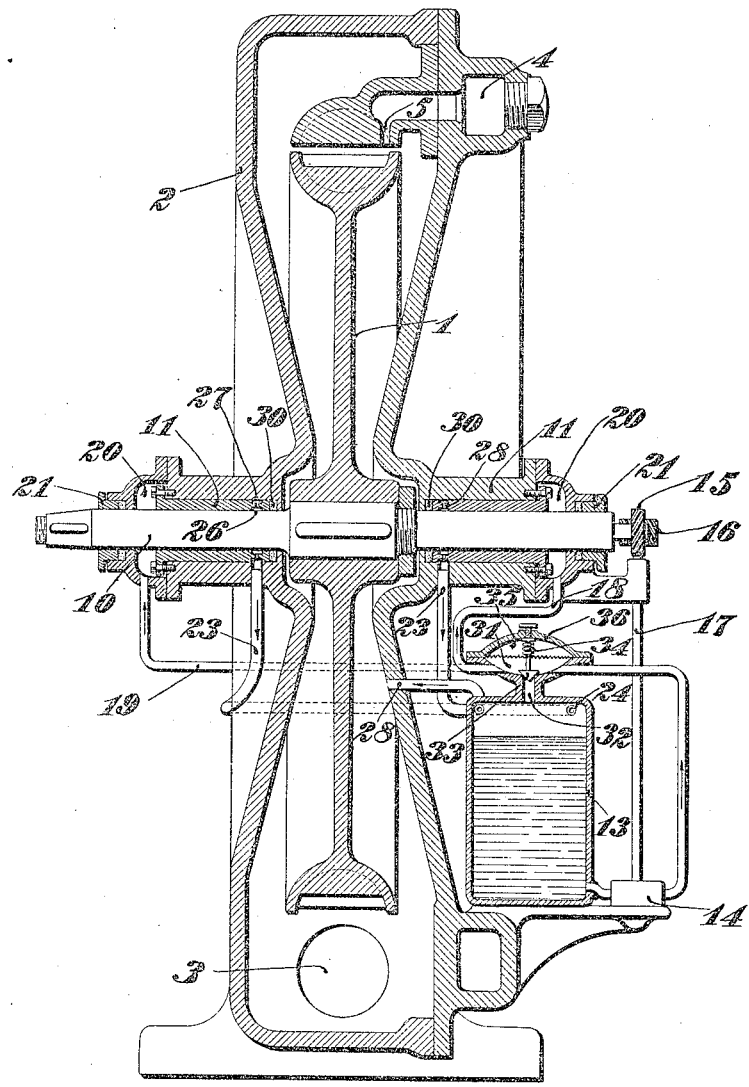

OLIVER D. H. BENTLEY, OF ROSLINDALE, MASSACHUSETTS, ASSIGNOR TO B. F. STURTEVANT COMPANY, OF HYDE PARK, MASSACHUSETTS, A CORPORATION OF MASSACHUSETTS.

LUBRICATING SYSTEM FOR CONDENSING-TURBINES AND THE LIKE.

1,305,958.

Specification of Letters Patent. Patented June 3, 1919.

Application filed August 29, 1917. Serial No. 188,850.

*To all whom it may concern:*

Be it known that I, OLIVER D. H. BENTLEY, a citizen of the United States, residing at Roslindale, in the county of Suffolk and State of Massachusetts, have invented certain new and useful Improvements in Lubricating Systems for Condensing-Turbines and the like; and I do hereby declare the following to be a full, clear, and exact description of the invention, such as will enable others skilled in the art to which it appertains to make and use the same.

The present invention relates to lubricating systems for bearings, such as the bearings of steam turbines of the condensing type in which one end of the bearing is subjected to atmospheric pressure while the other end is subjected to less than atmospheric pressure.

The object of the present invention is to provide a lubricating system which shall be particularly adapted for use upon the bearings of condensing turbines or analogous machines wherein one end of the bearing is subjected to less than atmospheric pressure, whereby the bearings may be thoroughly lubricated and the passage of air or of oil from the bearing into the region of reduced pressure will be effectively prevented.

With this object in view the present invention consists in the lubricating system hereinafter described and claimed.

In my prior Patent No. 1,150,485, dated August 17, 1915, and in my pending application Serial No. 1,157,806, filed March 27, 1917, I have shown and described a lubricating system particularly adapted for a non-condensing type of turbines, in which a substantial pressure of exhaust steam is maintained in the casing of the turbine. In such prior patent and pending application the leakage of steam through the bearing under the difference of pressure between the casing and the outer air is avoided by supplying the lubricant to the bearing adjacent the casing under a pressure substantially equal to or slightly higher than the exhaust pressure in the casing. In the present application the same broad principle of preventing leakage through the bearing is employed, the lubricant being supplied to the bearing adjacent the end which is subjected to the higher pressure and at such higher pressure, and being withdrawn from the other end of the bearing by suitable connecting and return devices, special provision being made to prevent the passage of the lubricant along the bearing into the casing under the influence of the vacuum which exists in the casing of a condensing turbine.

In the accompanying drawing which illustrates what is now considered to be the preferred embodiment of the present invention as applied to a condensing turbine, a turbine of a well-known impact type is shown in vertical section, having the usual rotor or wheel 1 which turns within a casing 2 provided with an exhaust port 3 connected in any suitable or convenient manner with a condenser (not shown) by means of which the interior of the casing is maintained at less than atmospheric pressure.

The steam is supplied through the passage 4 to the nozzle 5 by which it is directed into the buckets of the rotor. The exhaust steam escapes from the rotor buckets into the casing, and thence through the exhaust opening or port 3 to the condenser.

The rotor is mounted upon the shaft 10 which is supported in the bearing bushings 11, and in order to prevent the passage of air through the bearings from the outside into the casing, the lubricant is supplied to the outer end of the bearing at a pressure slightly above atmosphere, being withdrawn from the inner end of the bearing, that is adjacent the casing.

The lubricant is supplied from a reservoir 13, a pump 14 driven from the turbine shaft through the spiral gears 15 and 16 and vertical shaft 17 forcing the lubricant through the pipes 18 and 19 to the annular chambers 20 at the outer end of each bearing. The escape of the lubricant outwardly along the shaft is prevented by the stuffing boxes 21 on each end of the shaft.

The lubricant is withdrawn from the inner end of the bearing through the return pipes 23 which enter the top of the reservoir at 24. The lubricant is collected at the inner end of the bearing by means of annular grooves 26 and 27 on the inner and outer peripheral walls, respectively, of the bushing connected by passages 28, the return pipe opening into the outer groove 27 in the bushing.

In order to prevent the lubricant from working along the bearing into the casing under the suction of the vacuum, the interior of the casing is connected with the interior of the top of the lubricant reservoir by the equalizing pipe 28. Substantially the same vacuum is thus maintained in the return pipes 23 and lubricant-collecting grooves 26 and 27 as in the casing. The pressure thus being balanced, what little tendency there is for the lubricant to work along the shaft into the casing is easily overcome by soft packing 30.

In order to prevent the lubricant from being supplied under so great a pressure as to cause it to work outwardly through the stuffing boxes 21 or inwardly to the lubricant-collecting grooves 26, 27 in larger quantities than could properly be disposed of, a pressure regulating device is provided which is interposed between the pump and the bearings. This device comprises a chamber 31 interposed between the pump 14 and the supply pipes 18 and 19, and having a by-pass or return passage 32 controlled by a valve 33 which normally tends to close under the action of the spring 34. The valve is opened by means of a diaphragm 35 exposed on one side to atmospheric pressure through the aperture 36 and to the lubricant pressure on the other side in the chamber 31. When the pressure in the chamber 31 exceeds the predetermined pressure, the diaphragm and valve will be raised, permitting the lubricant to return to the reservoir through the bypass 32 in sufficient quantities to relieve the pressure until it falls to the predetermined amount. By adjusting the compression of the spring any desired pressure may be maintained. Preferably the lubricant will be delivered to the bearings at a pressure only slightly above atmosphere.

While I have shown and described what is considered now to be the preferred embodiment of my invention as applied to a condensing steam turbine, it is to be understood that the invention is not limited to the specific construction herein shown and described, but may be embodied in other forms and arrangements.

Having thus described my invention, what is claimed is:

1. The combination with the casing and shaft of a condensing steam turbine or the like and a shaft-bearing subject at the inner end to the less than atmospheric pressure in the casing, of means for supplying lubricant to the bearing and for withdrawing the lubricant from within the bearing and adjacent the inner end thereof under less than atmospheric pressure.

2. The combination with the casing and shaft of a condensing steam turbine or the like and a shaft-bearing subject at the inner end to the less than atmospheric pressure in the casing, of means for supplying lubricant to a chamber at the outer end of the bearing and for withdrawing the lubricant from the inner end only of the bearing under substantially the pressure in the casing.

3. The combination with the casing and shaft of a condensing steam turbine or the like and a shaft-bearing subject at the inner end to the less than atmospheric pressure in the casing, of means for supplying lubricant to a chamber at the outer end of the bearing, and for withdrawing the lubricant from the inner end only of bearing under substantially the pressure in the casing and means between the point of withdrawal and the end of the bearing tending to prevent the passage of oil to the end of the bearing.

4. The combination with the casing and shaft of a condensing steam turbine or the like and a shaft-bearing subject at one end to the less than atmospheric pressure in the casing, of means including a pump for delivering lubricant to the bearing, devices for controlling the pressure of the lubricant delivered to the bearing, a reservoir for the lubricant and connections from the reservoir to the interior of the casing and to the bearing adjacent the casing.

OLIVER D. H. BENTLEY.

Copies of this patent may be obtained for five cents each, by addressing the "Commissioner of Patents, Washington, D. C."